(12) United States Patent
Reed et al.

(10) Patent No.: US 7,660,425 B1
(45) Date of Patent: Feb. 9, 2010

(54) ACOUSTIC ECHO CANCELLATION

(75) Inventors: Martin Reed, Colchester (GB); Malcolm John Hawksford, Colchester (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/959,450

(22) PCT Filed: May 18, 2000

(86) PCT No.: PCT/GB00/01904

§ 371 (c)(1), (2), (4) Date: Oct. 25, 2001

(87) PCT Pub. No.: WO00/72567

PCT Pub. Date: Nov. 30, 2000

(30) Foreign Application Priority Data

May 25, 1999 (EP) .................................. 99304040

(51) Int. Cl.
H04B 3/20 (2006.01)

(52) U.S. Cl. .................. 381/66; 381/93; 381/71.11; 455/570; 379/406.01; 379/406.09

(58) Field of Classification Search .................. 381/66, 381/94.1, 71.11, 17, 18, 309, 310, 71.12, 381/93, 95, 96; 455/570; 379/406.1, 406.01, 379/406.06, 406.08, 406.09
See application file for complete search history.

(56) References Cited

U.S. PATENT DOCUMENTS

| 5,371,789 | A | | 12/1994 | Hirano |
| 5,649,011 | A | * | 7/1997 | Garofalo et al. ........ 379/406.08 |
| 5,661,813 | A | * | 8/1997 | Shimauchi et al. ............ 381/66 |
| 5,671,287 | A | * | 9/1997 | Gerzon ......................... 381/17 |
| 5,734,724 | A | | 3/1998 | Kinoshita et al. |
| 5,745,564 | A | | 4/1998 | Meek |
| 5,828,756 | A | * | 10/1998 | Benesty et al. ................ 381/66 |
| 6,246,760 | B1 | * | 6/2001 | Makino et al. ......... 379/406.08 |
| 6,553,122 | B1 | * | 4/2003 | Shimauchi et al. ............ 381/66 |
| 6,556,682 | B1 | * | 4/2003 | Gilloire et al. ................ 381/66 |
| 6,707,912 | B2 | * | 3/2004 | Stephens et al. ....... 379/406.08 |
| 6,895,093 | B1 | * | 5/2005 | Ali .............................. 381/66 |
| 6,931,123 | B1 | * | 8/2005 | Hughes ................. 379/406.01 |

(Continued)

FOREIGN PATENT DOCUMENTS

JP 01-303852 12/1989

(Continued)

OTHER PUBLICATIONS

Office Action, Canadian Patent Office, Application No. 2,373,114, Dec. 9, 2005, pp. 1-2.

*Primary Examiner*—Vivian Chin
*Assistant Examiner*—Jason R Kurr
(74) *Attorney, Agent, or Firm*—Nixon & Vanderhye PC

(57) ABSTRACT

A multiple channel steered spatialized signal is generated from a signal input modified according to respective spatialization gain functions to generate a plurality of audio channels. An echo cancellation signal is applied to a return path using a combined spatialization and echo path estimate. The estimate is derived from the gain functions applied to the respective channels. When the gain functions applied in the respective channels are changed, for instance to represent a different apparent position of the sound source, a new estimate of the echo paths is generated, based on a previous estimate of the echo path and on the new gain functions.

10 Claims, 4 Drawing Sheets

U.S. PATENT DOCUMENTS

| | | | |
|---|---|---|---|
| 6,990,205 B1 * | 1/2006 | Chen | 381/17 |
| 7,012,630 B2 * | 3/2006 | Curry et al. | 348/14.08 |
| 7,245,710 B1 | 7/2007 | Hughes | |

FOREIGN PATENT DOCUMENTS

| | | |
|---|---|---|
| JP | 05-316239 | 11/1993 |
| JP | 07-007557 | 1/1995 |
| JP | 09-130306 | 5/1997 |
| JP | 09-307651 | 10/1997 |
| JP | 09-261351 | 11/1997 |

\* cited by examiner

ACOUSTIC ECHO CANCELLATION

BACKGROUND

1. Technical Field

This invention relates to a method for multiple channel acoustic echo cancellation (AEC), applicable to systems that derive a multi-channel spatialised signal from a monophonic signal, each channel of which is applied to a respective member of an array of loudspeakers at differing gains to give the percept or audible illusion of directionality. This class of spatialised signal will be termed here as steered mono. A steered mono system uses two or more gain elements to represent the spatialisation, which is mapped to a panning processor to generate corresponding loudspeaker outputs. In the embodiments to be described, a two-channel stereophonic signal is used, with two loudspeakers—a system known as "stereo from steered mono" (SSM), but the principles of the invention can be applied to systems with more than two channels. The invention has application in teleconferencing systems where each talker's voice is artificially given spatial positioning for the benefit of the listener.

2. Related Art

For comfortable speech communication in a teleconference system that uses a loudspeaker and microphone, as opposed to a headset, a method of acoustic echo cancellation (AEC) is required. For monophonic systems the topology shown in FIG. 1 can be used with a number of different adaptive processes such as least mean square (LMS), recursive least squares (RLS) or fast affine projection (FAP). However, for stereophonic and multiple channel systems, existing solutions are far less advanced with some major obstacles yet to be overcome. The example in FIG. 2 shows that for a stereophonic system there are two echo paths, $h_1$ and $h_2$ (which include the microphone and loudspeaker impulse responses), compared to the single path in the monophonic case. (This assumes a single microphone is used, which is generally the case when spatialisation is to be created artificially. More generally, the number of echo paths is the product of the number of loudspeakers with the number of microphones).

Existing solutions to the stereo acoustic echo cancellation problem generally assume the system arrangement shown in FIG. 2 where the talker-to-microphone path responses are unknown. The aim of the adaptive process in the echo canceller is to use the signals $x_1(t), x_2(t)$ and $e(t)$ to train the adaptive filters $\hat{h}_1$ and $\hat{h}_2$ such that $$e(t) \to 0 \qquad (1)$$

With existing adaptive filter processes it is not possible to achieve a convergent set of filters such that $$h_1 = \hat{h}_1 \text{ and } h_2 = \hat{h}_2 \qquad (2)$$

Instead, a convergent solution such as the following is obtained $$h_1 * g_1 + h_2 * g_2 = \hat{h}_1 * g_1 + \hat{h}_2 * g_2 \qquad (3)$$

where * is the convolution operator. Note that Equation (3) satisfies Equation (1), but that Equation (2) is not a unique solution for Equation (3), so the values for $h_1$ and $h_2$ cannot be derived from this result.

If the filters $g_1$ or $g_2$ change, possibly due to the talker moving, the equality in Equation (3) no longer holds (unless Equation (2) is also met). Thus, the echo canceller no longer produces a convergent solution and the echo heard by the talker rises in level.

Various solutions to this problem have been proposed that either manipulate the loudspeaker signals, $x_1$ and $x_2$, or use the properties of the signals $x_1$ and $x_2$. The aim of these solutions is to make use of the cross-correlation properties of the two signals as it can be shown that a solution to Equation (2) exists when the two signals are sufficiently decorrelated. However, as the signals $x_1$ and $x_2$ are inherently highly correlated in a teleconferencing system, techniques that exploit the small decorrelated features in the signals have poor performance in anything but ideal conditions.

It has been proposed to add a small amount of independent white noise to the signals $x_1$ and $x_2$. It is shown that this significantly aids the convergence of the solution to that in Equation (2) by introducing some signal de-correlation. However, although adding noise in this manner does improve the convergence, the noise has to be added at such a level that it is undesirably audible.

BRIEF SUMMARY

According to an exemplary embodiment of the invention, there is provided a method of acoustic echo cancellation for a multiple channel steered spatialised signal, the steered spatialised signal being generated from a signal input modified according to respective spatialisation gain functions to generate a plurality of audio channels, the echo cancellation process using a combined spatialisation and echo path estimate, the estimate being derived from the gain functions applied to the respective channels, whereby when the gain functions applied in the respective channels are changed, an estimate of the echo is generated, the estimate being based on a previous estimate of the echo path and on the gain functions, the echo path estimates being used to generate an echo cancellation signal.

According to another aspect, there is provided apparatus for acoustic echo cancellation in a multiple channel steered spatialised audio system, the spatialised audio system comprising signal input means for receiving an audio signal, a plurality of audio output means for generating acoustic signals derived from the audio signal;

control means associated with the audio output means for generating gain control functions controlling the audio output means such that a spatialised version of the audio signal is generated by the said plurality of audio output means;

audio input means for detecting acoustic signals;

signal output means for transmitting a signal derived from the acoustic signals detected by the audio input means;

echo path estimation means comprising detection means for identifying changes in the gain control functions in the respective control means, and estimation means for generating an estimate of the echo path between the acoustic output means and the acoustic input means, the estimate being based on a previous estimate of the echo path and on the gain control functions detected by the detection means, echo cancellation signal generation means for generating an echo cancellation signal derived from the spatialised audio signals generated by the control means and the estimates derived by the echo path estimation means, and signal combination means for applying the echo cancellation signal to the signal generated by the audio input means.

This exemplary embodiment of the invention is an adaptation of the monophonic LMS process and avoids multiple updates to two of more echo path estimates, such as $\hat{h}_1$ and $\hat{h}_2$, and reduces the number of filter operations required when compared with existing stereo echo cancellation processes, such as $\hat{h}_1 * x1$ and $\hat{h}_2 * x_2$. Additionally, this embodiment of the invention uses the spatialisation parameters in the adaptive process, unlike existing stereo echo cancellation processes. The LMS update is modified to take into account the spatialisation parameters that are used to update the aggregated echo path estimate each time the spatialisation changes. After the Nth spatialisation change, (where N is the number of channels in the system), the aggregated echo path estimate converges towards the aggregate echo path for future changes in spatialisation. Prior to the Nth spatialisation change the process converges to a local solution for the aggregated echo path estimate so that some echo signal reduction is still given in the learning stage of the process.

The learning stage can be made part of a set-up phase prior to use of the system for live traffic. For example, the required number of spatialisation changes can be achieved by operating the monophonic LMS process for each channel in turn, by setting the gains of the other channels to zero.

BRIEF DESCRIPTION OF THE DRAWINGS

An embodiment of the invention will now be described, by way of example, with reference to the Figures in which.

DETAILED DESCRIPTION OF THE EXEMPLARY EMBODIMENTS

Figure 1:
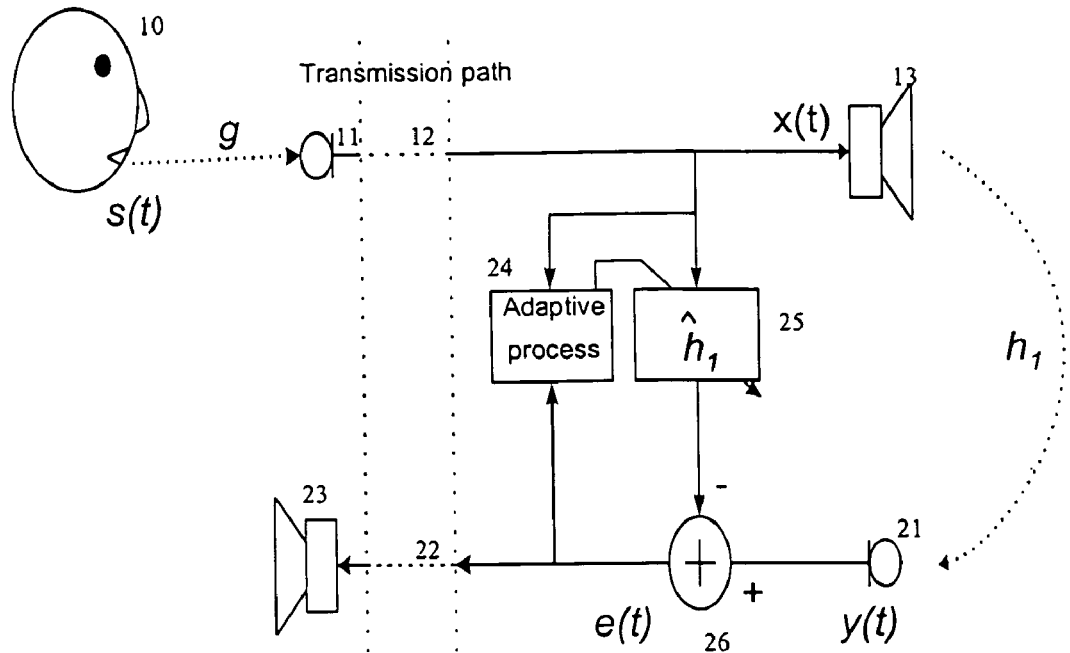
FIG. 1 illustrates the principles of monophonic echo cancellation

The monophonic system illustrated in FIG. 1 comprises an input path 12 connected to the source (microphone 11 and speaker 10) of the original signal s(t). This signal s(t) is modified by the transmission path 12 to generate a loudspeaker signal x(t) which is fed to the loudspeaker 13. The return path consists of a microphone 21, return transmission path 22 and loudspeaker 23. An acoustic path $h_1$ exists between the loudspeaker 13 of one path and the microphone 21 of the other path. Hence, some sound originating with the speaker 10 will be returned to the loudspeaker 23 and will be heard by the speaker 10 as echo. This effect can be intrusive, especially as the transmission paths 12, 22 can introduce delays, so an echo cancellation processor 24, 25, 26 is installed to eliminate this signal. An adaptive processor 24 compares the signal e(t) to be transmitted over the return path 22 with the signal x(t) arriving over the input path 12 and identifies correlations between them. This is used to control an adaptive filter bank 25, to generate a vector $\hat{h}_1$. This vector is an estimate of the acoustic path $h_1$. This vector is applied to the input signal x(t) by the filter and the result subtracted from the input y(t) from the microphone 21 in a combiner 26 to generate a return signal e(t). If the adaptive filter 25 generates an accurate estimate $\hat{h}_1$ of the function $h_1$, the echo signal y(t) should therefore be cancelled out by the output from the adaptive filter 25 and e(t) should therefore be zero. Therefore the only signals transmitted over the return path 22 will be sounds generated near the microphone 21 and not received from the loudspeaker 13.

Figure 2:
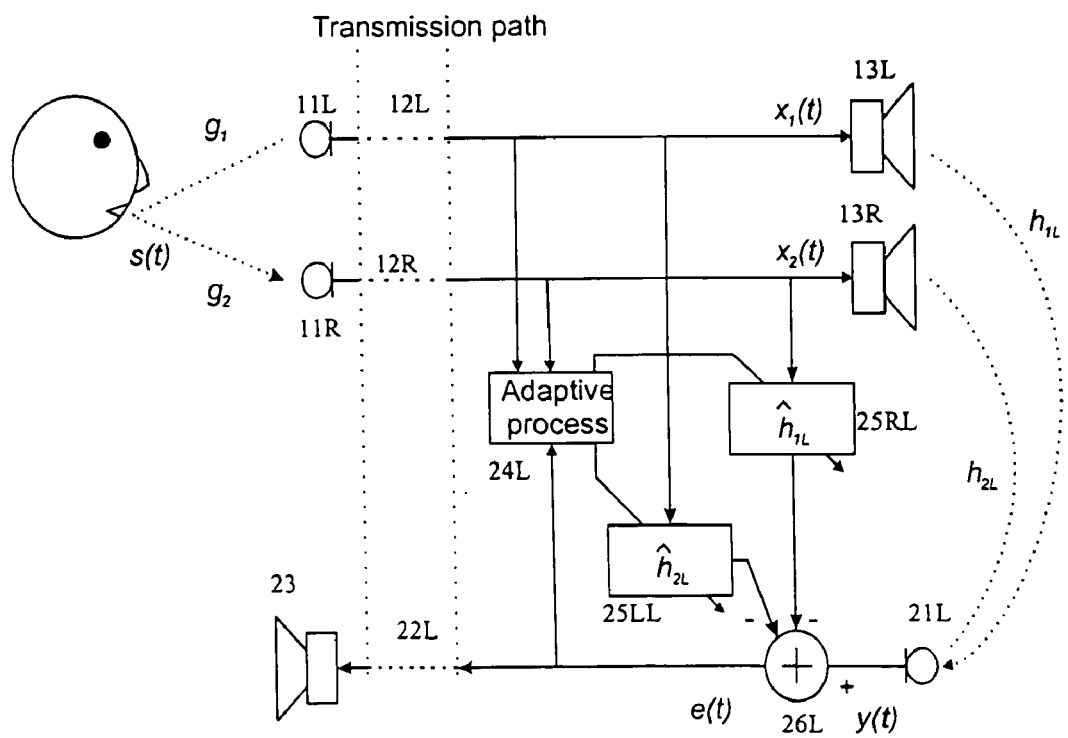
FIG. 2 illustrates the basic principles of stereophonic echo cancellation (only one half of return path shown)

FIG. 2 illustrates a generalised stereophonic system. The situation is similar to that of FIG. 1, except that there are now two loudspeakers and two microphones (indicated by the suffixes "L" and "R" in FIG. 2) at each end. Only one channel 22L of the return path is shown. For each return path 22L, (22R) there are two echo path estimates $\hat{h}_{1L}$, $\hat{h}_{2L}$, one for each outward path 12L, 12R, because each microphone 21L, (21R) is capable of receiving acoustic feedback from both loudspeakers 13L, 13R. Because the two outward paths 12L, 12R are carrying signals from the same source 10, there is significant correlation between the two estimates $\hat{h}_{1L}$, $\hat{h}_{2L}$ and the processes generating the adaptive filter values 25LL, 25RL are therefore not independent.

In the general case shown in FIG. 2, the original functions $g_1$, $g_2$ are unknown at the receiving end, being dependant on the relative positions of the microphones 11L, 11R and the speaker 10. It is therefore not possible to derive a unique solution for $\hat{h}_{1L}$, $\hat{h}_{2L}$. For a given spatialisation the adaptive processor 24L will generate two suitable functions $\hat{h}_{1L}$, $\hat{h}_{2L}$, for which equation (3) above holds:

$$h_1 * g_1 + h_2 * g_2 = \hat{h}_1 * g_1 + \hat{h}_2 * g_2 \tag{3}$$

but this does not necessarily imply that Equation (2) also holds:

$$h_1 = \hat{h}_1 \text{ and } h_2 = \hat{h}_2 \tag{2}$$

If the spatialisation, and hence the functions $g_1, g_2$ are changed, it will be seen that the adaptive filters must be reset to correspond to the new spatialisation.

Figure 3:
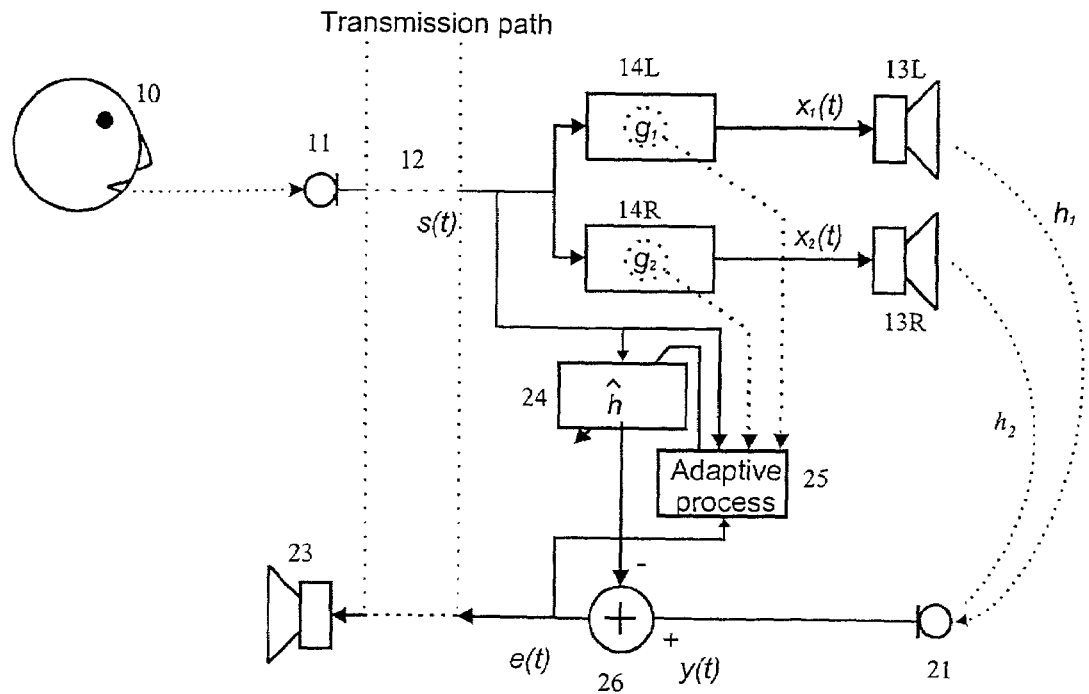
FIG. 3 illustrates an embodiment of the invention
Figure 4:
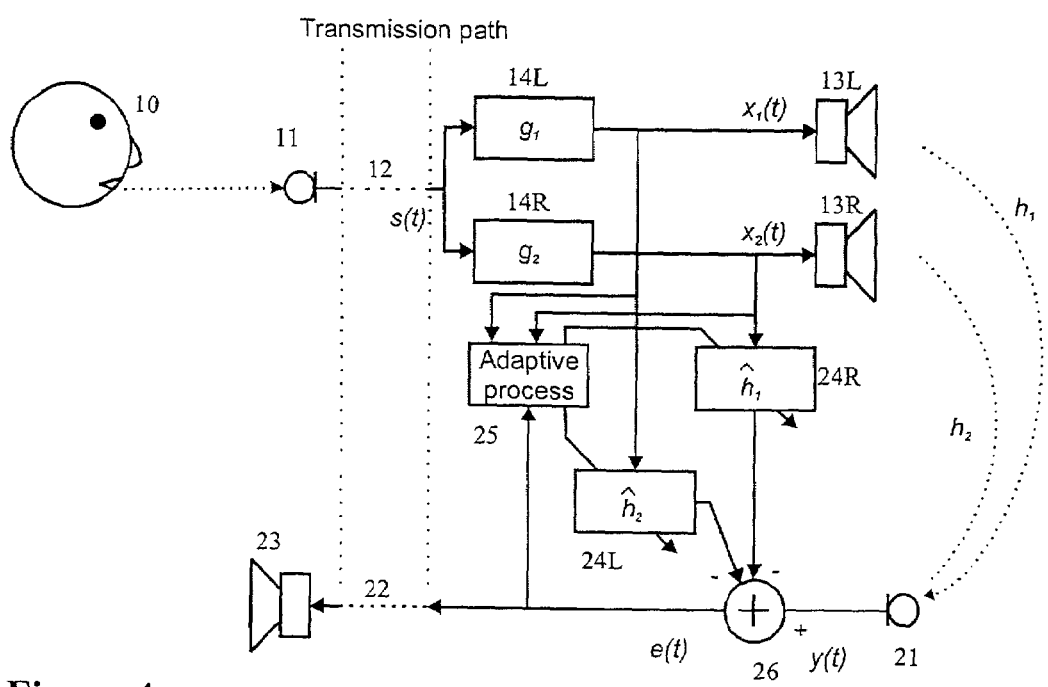
FIG. 4 illustrates a theoretical equivalent system to that of FIG. 3

In a steered system such as that illustrated in FIGS. 3 and 4, a monophonic source 11 is used and the functions $g_1, g_2$ become scalar values $g_1, g_2$ representing gain. Consequently, there is only one transmit path 12, 22 in each direction. Control information, either generated at the receive end or transmitted with the monophonic signal s(t), is used to control variable gain amplifiers 14L, 14R to vary the gain functions $g_1, g_2$ defining the spatialisation at the receive end, to emulate a stereophonic source. The fact that the gain functions $g_1, g_2$ are known at the receive end allows them to be used in the adaptive processor 24, 25.

Figure 7:
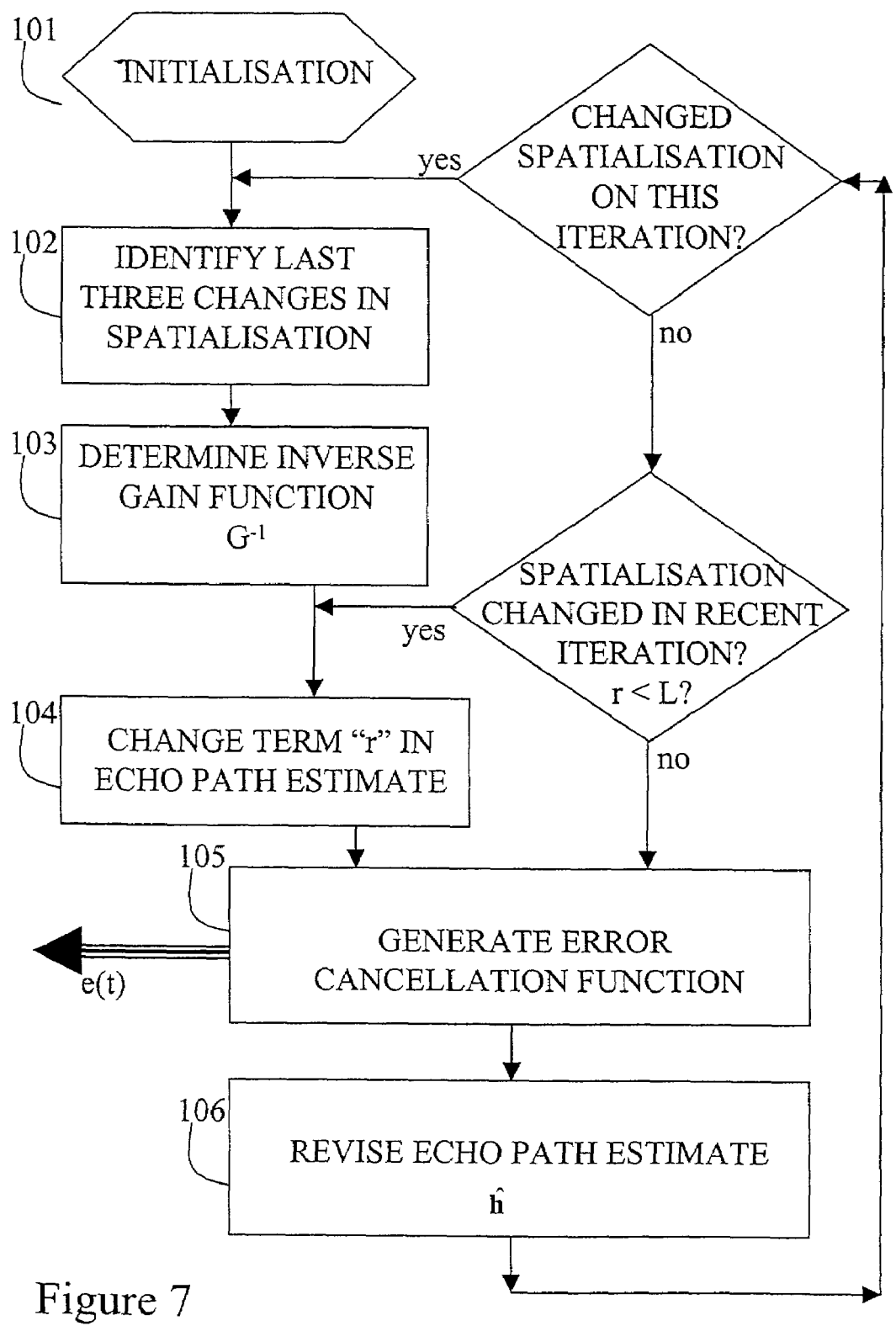
FIG. 7 is a flow diagram showing the updating process of the preferred embodiment.

The operation of the adaptive processor 24, 25 will now be described, with reference to FIG. 7. The underlying mathematical theory will then be described, with reference to FIGS. 3 and 4.

Following an initialisation step 101 in which notional values for the gain functions $g_1, g_2$ are set, the process runs on an iterative loop for each sampling period n as follows.

Firstly, values $k_1$, $k_2$, $k_3$ are set (step 102). These identify the last three sampling periods at which the spatialisation values $g_1, g_2$ changed. If the spatialisation gain values $g_1, g_2$ have not changed since the previous sample n−1, the values of $k_1, k_2, k_3$ are the same as for the previous sample. However, if the values have changed, then $k_3$ is set to the previous value of $k_2$, $k_2$ is set to the previous value of $k_1$, and $k_1$ is set to n−1.

The estimated gain function is then determined (step 103). This is the matrix $$\begin{bmatrix} g_1(k_3) & g_2(k_3) \\ g_1(k_2) & g_2(k_2) \end{bmatrix} = G(k_2, k_3).$$

If the spatialisation values $g_1, g_2$ are unchanged, this matrix is also unchanged and does not need to be recalculated. The inverse of this matrix is then determined.

$$\begin{bmatrix} y_{00} & y_{01} \\ y_{10} & y_{11} \end{bmatrix} = G^{-1}(k_2, k_3)$$

Again, if the spatialisation values, $g_1, g_2$ are unchanged, this matrix is also unchanged and does not need to be recalculated.

Next, (step 104), if $r=n-k_1+1$ is less than the number of terms L in the estimated echo path vector $\hat{h}$ (in other words, if the number of samples r elapsed since the last spatialisation change is less than L), one term in the estimated echo path vector $\hat{h}_{n-1}$ is amended as follows $$\hat{h}_{n-1}(r) = (y_{00}\hat{h}_{k3}(r) + y_{01}\hat{h}_{k2}(r))g_1 + (y_{10}\hat{h}_{k3}(r) + y_{11}\hat{h}_{k2}(r))g_2$$

($\hat{h}_{n-1}$ is the specific instance of the estimated echo path function $\hat{h}$ from the previous iteration). All other terms $\hat{h}_{n-1}(0) \ldots \hat{h}_{n-1}(r-1)$ and $\hat{h}_{n-1}(r+1) \ldots \hat{h}_{n-1}(L-1)$ remain unchanged.

The error cancellation signal $s_n^T \hat{h}_{n-1}$ (where $s_n$ is the vector representing the last L samples of the input signal s(n)) is then generated using the revised estimate echo path vector $\hat{h}_{n-1}$ (step 105) and subtracted from the signal y(n) to generate the output signal e(n).

The estimated echo path vector $\hat{h}_{n-1}$ is then adapted in response to the echo signal e(n) (step 106) for use in the next iteration.

$$\hat{h}_n = \hat{h}_{n-1} + \mu s_n \epsilon(n)$$

where $\epsilon(n) = s_n^T s_n e(n)$ and $\mu$ is the step size.

The progress is stable provided that the spatialisation changes on a longer timescale than the period L, and that $0 \leq \mu < 2$.

The computational complexity of steps 105-106 in the above process is the same as the normalised LMS process which is of the order 2L. The number of computations is of the order of two multiplications and one division for the matrix inversion used in step 103. As this is only performed once after each change in spatialisation it adds little to the complexity of the process for large L. Step 104 is only calculated in the first L samples after a spatialisation change and is insignificant for large L. Thus, when the process shown above is used for acoustic echo cancellation with a steered mono system, for which it is likely that L>100, the process has a complexity of approximately 2L.

A mathematical description follows. This will start from the system shown in FIG. 4 and then proceed to show that it is equivalent to the system according to the invention shown in FIG. 3 which utilises a single aggregated echo path estimate.

As shown in FIG. 4, the two microphone impulse response paths 12L, 12R (FIG. 2) are replaced by two artificially generated impulse responses $g_1$ and $g_2$ that act upon a single microphone signal s(t) received over the monophonic path 12 to generate the percept or illusion of spatialisation. For the solution presented here the functions $g_1$ and $g_2$ are further simplified by representing them as simple gain functions rather than impulse responses. This system works in a completely different manner from the prior art system of FIG. 2 as, rather than trying to decorrelate the signals $x_1$ and $x_2$ to help the convergence, the method presented here relies upon the inherent highly correlated nature of the signals $x_1$ and $x_2$. The method uses the knowledge of the functions $g_1$ and $g_2$ (which are unknown in the prior art systems) to achieve a convergent echo cancellation. Before describing an adaptive filter solution to the echo problem it will be demonstrated that a solution to the problem exists.

Let the input to the spatialisation block at sample time n be represented by a column vector $s_n = [s(n)\ s(n-1) \ldots s(n-(L-1))]^T$, the input to the listener end microphone by $y_n = [y(n)\ y(n-1) \ldots y(n-(L-1))]^T$ and the two loudspeaker-to-microphone echo paths be length L column vectors $h_1$ and $h_2$ (which incorporate the loudspeaker and microphone impulse responses), then $$y_n = g_1(n) S_n h_1 + g_2(n) S_n h_2 \quad (4)$$

where the spatialisation is represented as the gain values $g_1(n)$ and $g_2(n)$ which are constant over the sample periods n−(L−1) ... n, and $S_n = [s_n \ldots s_{n-(L-1)}]^T$. (This is a "Toeplitz" matrix, that is, a symmetrical matrix of order L×L, having the terms of $s_n$ in the first row and the first column, the terms of $s_{n-1}$ in the second row and column, and so on). It can be shown that $h_1$ and $h_2$ cannot be solved from Equation (4).

However, now consider using a second set of input and output observations at sample time n+a where $\Delta \geq L$ and $$g_1(n+a) = g_1(n+a-1) = \ldots = g_1(n+1) \neq g_1(n)\ g_2(n+a) = g_2(n+a-1) = \ldots = g_2(n+1) \neq g_2(n) \quad (5)$$

in other words the functions $g_1$ and $g_2$ have changed between sample time n and sample time n+1, but then remained unchanged between time n+1 and sample time n+a.

Hence, $$\begin{bmatrix} y_n \\ y_{n+a} \end{bmatrix} = (G_{n,n+a} \otimes I_L) \begin{bmatrix} S_n \\ S_{n+a} \end{bmatrix} \begin{bmatrix} h_1 \\ h_2 \end{bmatrix} \quad (6)$$

where $I_L$ is the L×L identity matrix, $$G_{n,n+a} = \begin{bmatrix} g_1(n) & g_2(n) \\ g_1(n+a) & g_2(n+a) \end{bmatrix} \quad (7)$$

and $\otimes$ is the Kronecker product. (The Kronecker product of two matrices A and B is given by multiplying matrix B separately by each individual term in matrix A and forming a new matrix, (whose order is the product of the original two matrices) with the resulting terms).

The solution to Equation (6) is $$\begin{bmatrix} S_n \\ S_{n+a} \end{bmatrix}^{-1} (G_{n,n+a} \otimes I_L)^{-1} \begin{bmatrix} y_n \\ y_{n+a} \end{bmatrix} = \begin{bmatrix} h_1 \\ h_2 \end{bmatrix} \quad (8)$$

and using Kronecker product identities $$\begin{bmatrix} S_n \\ S_{n+a} \end{bmatrix}^{-1} (G_{n,n+a}^{-1} \otimes I_L) \begin{bmatrix} y_n \\ y_{n+a} \end{bmatrix} = \begin{bmatrix} h_1 \\ h_2 \end{bmatrix} \quad (9)$$

Thus, a solution for $h_1$ and $h_2$ exists if the signal s is persistently exciting (i.e. it has a full spectral content) and the matrix $G_{n,n+a}$ is non-singular, that is, it has an inverse matrix. The non-singular condition for $G_{n,n+a}$ is met if the spatialisation values at sample times n and n+a are different and not scalar multiples of each other (i.e. $g_1(n)/g_2(n) \neq g_1(n+a)/g_2(n+a)$). Ideally the values should be sufficiently different such that the solution of Equation (9) is well conditioned.

Having established that a solution exists the adaptive process for the solution is now derived from the LMS process. The normalised LMS (NLMS) process is used to perform monophonic echo cancellation as discussed with reference to FIG. 1 using the following updates $$e(n)=y(n)-s_n^T \hat{h}_{n-1} \tag{10}$$

$$\epsilon(n)=s_n^T s_n e(n) \tag{11}$$

$$\hat{h}_n = \hat{h}_{n-1} + \mu s_n \epsilon(n) \tag{12}$$

where e(n) is the echo signal, $\mu$ is the step size parameter and $\hat{h}_n$ is the echo path estimate at the nth sample instance. The single channel normalised LMS equations above can be modified for the steered mono case by using a single aggregate echo path estimate and redefining $\hat{h}_{n-1}$ as $$\hat{h}_{n-1}^T = [\hat{h}_1(0)g_1(n) + \hat{h}_2(0)g_2(n), \ldots , \tag{13}$$
$$\hat{h}_1(L-1)g_1(n-(L-1)) + \hat{h}_2(L-1)g_2(n-(L-1))]$$

where $\hat{h}_1(t)$ and $\hat{h}_2(t)$ are functions representing the two echo path estimates at sample interval n. Likewise define h as the combination of $h_1(t)$ and $h_2(t)$ in a form equivalent to that shown in Equation (13)

$$h^T = [h_1(0)g_1(n) + h_2(0)g_2(n), \ldots , \tag{14}$$
$$h_1(L-1)g_1(n-(L-1)) + h_2(L-1)g_2(n-(L-1))]$$

The task is then to use and update $\hat{h}$ such that the normalised LMS updates of equations 10, 11 and 12 are used for the echo cancellation rather than using two echo path estimates explicitly. If the values of $g_1(n)$ and $g_2(n)$ are constant for all n then the updates in Equation 10, 11 and 12 can be used unchanged to determine an estimate of h, as h is constant over time. However, if $g_1(n)$ and $g_2(n)$ change over time then this solution can not be used as a change in h is not taken into account in the LMS updates of Equations 10, 11 and 12.

Consider three sample epochs i, i−a and i−b where $$b \gg L > a \tag{15}$$

and $$g_1(i)=g_1(i-1)=\ldots=g_1(i-a) \neq g_1(i-a-1)=g_1(i-a-2)=\ldots$$
$$=g_1(i-b) \, g_1(i-b) \neq g_1(i-b-1)=g_1(i-b-2)=\ldots =g_1(i-\infty) \tag{28}$$

and likewise for $g_2(n)$, i.e. values of $g_1(n)$ and $g_2(n)$ change only on the epochs i−a and i−b.

Consider the value of the jth coefficient in the combined echo path at the epochs i−a−1 and i−b−1 (i.e. just prior to the spatialisation changes) which from Equations 14 and 16 is given by $$h_{i-b-1}(j)=h_1(j)g_1(i-b-1)+h_2(j)g_2(i-b-1) \tag{17}$$

$$h_{i-a-1}(j)=h_1(j)g_1(i-a-1)+h_2(j)g_2(i-a-1) \tag{18}$$

Equations 17 and 18 can be expressed as $$\begin{bmatrix} h_{i-b-1}(j) \\ h_{i-a-1}(j) \end{bmatrix} = \begin{bmatrix} g_1(i-b-1) & g_2(i-b-1) \\ g_1(i-b-1) & g_2(i-b-1) \end{bmatrix} \begin{bmatrix} h_1(j) \\ h_2(j) \end{bmatrix} \tag{19}$$

and thus $$G^{-1}_{i-b-1,i-a-1} \begin{bmatrix} h_{i-b-1}(j) \\ h_{i-a-1}(j) \end{bmatrix} = \begin{bmatrix} h_1(j) \\ h_2(j) \end{bmatrix} \tag{20}$$

using the definition of G from (7).

Further consider the value of the jth coefficient in the combined echo path at the epoch i which, from (14) and (16) is given by $$h_i(j) = \begin{cases} h_{i-1}(j) & j < i-a \\ h_1(j)g_1(i) + h_2(j)g_2(i) & j = i-a \\ h_{i-1}(j) & j > i-a \end{cases} \tag{21}$$

If the elements of $G^{-1}$ are defined by a variable $\gamma$ such that $$G_i^{-1} = \begin{bmatrix} \gamma_{00} & \gamma_{01} \\ \gamma_{10} & \gamma_{11} \end{bmatrix} \tag{22}$$

then from (19), (21) and (22)

$$h_i(j)=(\gamma_{00}h_{i-b-1}(j)+\gamma_{01}h_{i-a-1}(j))g_1(i)+(\gamma_{10}h_{i-b-1}(j)+\gamma_{11}h_{i-a-1}(j))g_2(i) \quad \text{(Equation 23)}$$

This equation is the additional update required for the normalised LMS update of Equations (10), (11) and (12). Note that from (21) only one coefficient in h need be updated in each sample period to take account of a spatialisation change.

The process can be extended to a system that has more than two channels, by making a small modification to the process. Specifically for an N-channel system the previous N+1 changes in the spatialisation position are recorded in variables $k_{N+1}, \ldots, k_1$ from the least to most recent respectively. The matrix G is generalised as $$G = \begin{bmatrix} g_1(k_{N+1}) & \cdots & g_N(k_{N+1}) \\ \vdots & \ddots & \vdots \\ g_1(k_2) & \cdots & g_N(k_2) \end{bmatrix} \tag{24}$$

The step 104 may be generalised as $$\hat{h}(r) = [g_1(n) \ldots g_N(n)]G^{-1} \begin{bmatrix} \hat{h}(r) \\ \vdots \\ \hat{h}(r) \end{bmatrix} \tag{25}$$

The steps 105 and 106 remain unchanged.

Figure 5A:
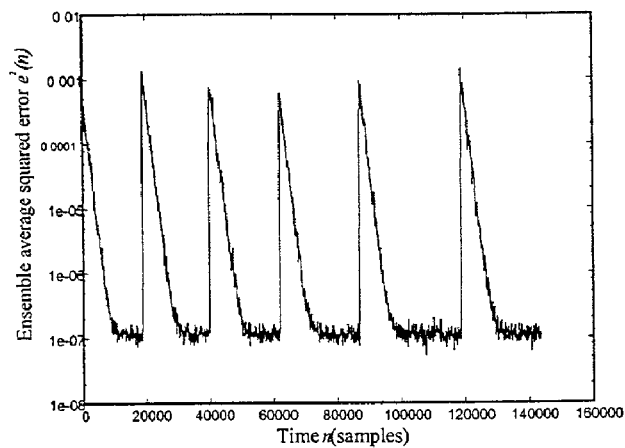
FIG. 5 is a graphical illustration of the averaged error for the system shown in FIG. 3 comparing prior art systems with that of the invention
Figure 5B:
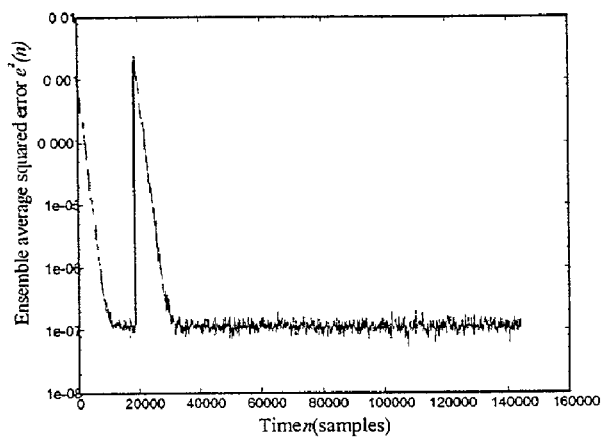

To demonstrate the described process both the stereo normalised least mean square process according to the invention and the normalised least mean square process were simulated using the configuration shown in FIG. 3 and with echo paths taken from actual measured microphone/speaker paths. The spatialisation position was changed five times during the simulation to test the ability of the process to adapt to changing spatialisation. FIG. 5 shows the ensemble-averaged error in the echo cancellation for a sampled Gaussian white noise (GWN) input. For the simulations the step-size parameter $\mu$ was 0.1, the filter length L=200, the sample rate was 8 kHz and a noise signal was added 40 dB below the input signal. FIG. 5 shows that initially the Normalised LMS process (FIG. 5a) and the Stereo Normalised LMS process according to the invention (FIG. 5b) have identical performance up until sample 40000. Note that the error in both processes falls initially as the adaptive filters converge to the static value of the aggregate path vector h. However, at sample period 19000 the spatialisation changes, such that h changes and consequently the error rises suddenly in both processes. The normalised LMS process (FIG. 5a) does not yet have enough information to form the correct aggregate path vector h as it requires two spatialisation positions to determine the individual path vectors $h_1$ and $h_2$. However, after the second spatialisation position the process according to the invention can make an estimate of the value of the changed h. This can be observed in FIG. 5 as the error does not rise after sample 40000 for the error curve in b) unlike that for the normalised LMS process in a) which demonstrates increases in the error each time the spatialisation changes.

Figure 6:
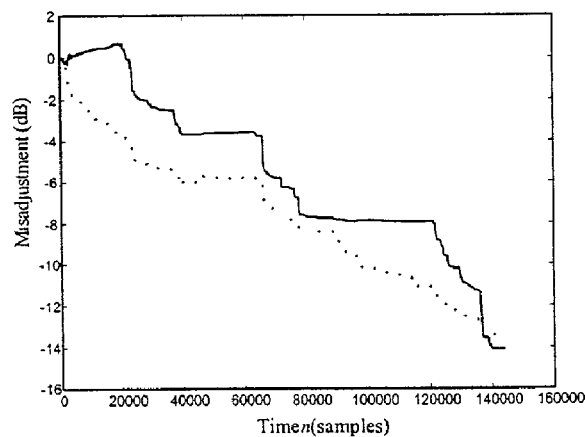
FIG. 6 illustrates the decline over time in the misadjustment in the error path estimates $\hat{h}_1$ and $\hat{h}_2$ using the inventive process.

The performance of the process according to the invention can also be observed for speech signals in FIG. 6 which shows the misadjustment in the two echo path estimate vectors $\hat{h}_1$ and $\hat{h}_2$. These vectors are not actually calculated explicitly by the process: however, it does use a solution for them as part of the update. Equation 20 was used to form the graphs shown in FIG. 6. Note that the misadjustment falls in one of the filters and rises in the other over the course of the first spatialisation position, which is between samples 0 and 19000. This is caused by the fact that $g_1(0)=0.2$ and $g_2(0)=0.8$ which means that most of the echo signal energy is derived from the second filter path such that the aggregate filter estimate $\hat{h}$ tends towards the second path filter $h_2$. At this point there is no a priori information which allows the true solution of $h_1$ and $h_2$. However, as soon as the second spatialisation position starts at sample 19000 the misadjustment in both $\hat{h}_1$ and $\hat{h}_2$ starts to fall as the Stereo Normalised LMS process allows a solution for $h_1$ and $h_2$ to be formed.

The process described uses the normalised least mean square adaptive filter to form the update of the combined echo path estimate. However, any current or future adaptive process that updates an estimate of an unknown filter on a sample by sample basis can be used in place of the described normalised least mean square algorithm. The only modification required is to replace the process step 106 with another filter update. Suitable existing examples are fast affine projection, least mean squares or recursive least mean squares adaptive filters.

What is claimed is:

1. A method of acoustic echo cancellation for multiple channel steered spatialized signals, the multiple channels forming the steered spatialized signals all being generated from a single monophonic input, and each channel having a predetermined respective spatialization gain transfer function applied thereto, the echo cancellation process comprising:

using a combined spatialization and echo path estimate derived from the spatialization gain transfer functions applied to the respective channels, when the spatialization gain transfer functions applied in the respective channels are changed, generating an estimate of echo paths, the estimate being based on a previous estimate of the echo of an echo path and on comparison of the spatialization gain transfer functions; and using the echo path estimates to generate an echo cancellation signal.

2. A method as in claim 1, in which the spatialization gain functions applied to the respective channels are scalar gain factors.

3. A method as in claim 1 in which a normalized least mean square adaptive filter is used to form the update of the combined echo path estimate.

4. A method as in claim 1 in which a fast affine projection adaptive filter is used to form the update of the combined echo path estimate.

5. A method as in claim 1 in which a recursive least mean squares adaptive filter is used to form the update of the combined echo path estimate.

6. Apparatus for acoustic echo cancellation in a multiple channel steered spatialized audio system, the spatialized audio system comprising:

a single monophonic input for receiving an audio signal;

a plurality of audio output means for generating acoustic signals derived from the audio signal;

control means associated with the audio output means for generating spatialized gain control inputs controlling the audio output means such that a spatialized version of the audio signal is generated by said plurality of audio output means;

audio input means for detecting acoustic signals;

signal output means for transmitting a signal derived from the acoustic signals detected by the audio input means;

echo path estimation means comprising detection means for identifying changes in the spatialization gain transfer functions in the respective control means, and estimation means for generating an estimate of an echo path between the acoustic output means and the acoustic input means, the estimate being based on a previous estimate of the echo path and on comparison of the spatialization gain transfer functions, echo cancellation signal generation means for generating an echo cancellation signal derived from the spatialized audio signals generated by the control means and the estimates derived by the echo path estimation means, and signal combination means for applying the echo cancellation signal to the signal generated by the audio input means.

7. Apparatus as in claim 6, in which spatialization gain functions applied to the respective channels by the control means are scalar gain factors.

8. Apparatus as in claim 6 in which the echo path estimation means uses a normalized least mean square adaptive filter to form an update of the combined echo path estimate.

9. Apparatus as in claim 6 in which the echo path estimation means uses a fast affine projection adaptive filter to form an update of the combined echo path estimate.

10. Apparatus as in claim 6 in which the echo path estimation means uses a recursive least mean squares adaptive filter to form an update of the combined echo path estimate.

* * * * *